United States Patent
Lou

(10) Patent No.: US 7,243,118 B2
(45) Date of Patent: Jul. 10, 2007

(54) METHOD AND APPARATUS FOR EFFICIENT DERIVATION OF MODULO ARITHMETIC FOR FREQUENCY SELECTION

(75) Inventor: Wenkwei Lou, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 653 days.

(21) Appl. No.: 10/630,122

(22) Filed: Jul. 30, 2003

(65) Prior Publication Data

US 2005/0027776 A1 Feb. 3, 2005

(51) Int. Cl.
*G06F 7/72* (2006.01)

(52) U.S. Cl. ..................................... 708/491
(58) Field of Classification Search ................ 708/491
See application file for complete search history.

(56) References Cited

U.S. PATENT DOCUMENTS

| | | | | |
|---|---|---|---|---|
| 5,499,299 A | * | 3/1996 | Takenaka et al. | 380/28 |
| 6,026,421 A | * | 2/2000 | Sabin et al. | 708/523 |
| 6,366,940 B1 | * | 4/2002 | Ono et al. | 708/491 |
| 6,760,319 B1 | * | 7/2004 | Gerten et al. | 370/335 |
| 7,031,995 B2 | * | 4/2006 | Schmandt et al. | 708/491 |
| 7,035,314 B1 | * | 4/2006 | Linsky | 375/133 |

\* cited by examiner

*Primary Examiner*—D. H. Malzahn
(74) *Attorney, Agent, or Firm*—Garlick Harrison & Markison; Gary W. Hamilton

(57) ABSTRACT

A method and apparatus for efficiently deriving modulo arithmetic solutions for frequency selection in transceivers. A frequency for communication between a wireless user interface device and a wirelessly enabled host is generated by calculating a modulo solution for an input variable. In some embodiments of the invention, the communication between the user input device and the wirelessly enabled host complies with the Bluetooth wireless communication standard. For the embodiments of the present invention relating to communications systems implementing the Bluetooth standard, a method and apparatus is disclosed for generating communication frequencies based on modulo 23 and modulo 79 solutions input variables. The method and apparatus of the present invention can generate the communication frequency with a minimum number of calculations using simple binary addition, as opposed to prior art methods that generally require numerous iterations and complex calculations.

24 Claims, 13 Drawing Sheets

METHOD AND APPARATUS FOR EFFICIENT DERIVATION OF MODULO ARITHMETIC FOR FREQUENCY SELECTION

BACKGROUND

1. Technical Field

The present invention relates generally to digital computers; and more particularly to a method and apparatus for efficient derivation of modulo arithmetic for frequency selection in wireless interface devices coupled to digital computers.

2. Related Art

Wireless communication technology has advanced rapidly over the past few years. One of the most promising areas for the use of wireless technology relates to communications between input/output devices and their "host" computers. For example, wireless keyboards and mice now couple via wireless connections to their host computers. These "wireless" input devices are highly desirable since they do not require any hard-wired connections with their host computers.

Many current wireless devices communicate with the host computer by implementing a frequency hopping scheme as defined in the "Bluetooth" Specification Version 1.1, November, 2000, which by this reference is incorporated for all purposes. The Bluetooth specification defines a frequency selection module having an output that constitutes a pseudo-random sequence having either 79 hops or 23 hops, depending on the specific implementation. The pseudo-random frequency hopping scheme is implemented using a modulo arithmetic derivation for selecting the frequencies to be used. Current methods for calculating the modulo arithmetic solution for the frequency hopping are comparatively complicated and, therefore, processor intensive and consume a significant amount of power. This is undesirable in wireless devices that rely on battery power. Thus, there is a need in the art for a method and apparatus for efficiently calculating the modulo arithmetic solution for frequency hopping in transceivers used by wireless input devices to communicate with their host computers, thereby providing more efficient operation and extended operating time when the device is operating on battery power.

SUMMARY OF THE INVENTION

The present invention overcomes the shortcomings of the prior art by providing a method and apparatus for efficiently deriving modulo arithmetic for frequency selection in transceivers. Specifically, the modulo solution provided by the method and apparatus of the present invention can be provided by a minimum number of calculations using simple binary addition, as opposed to prior art methods that generally require numerous iterations and complex calculations. The method and apparatus of the present invention is particularly effective for transceivers used in wireless interface devices used to communicate with a wirelessly enabled host computer.

In the method and apparatus of the present invention, a frequency for communication between a wireless user interface device and a wirelessly enabled host is generated by calculating a modulo solution for an input variable. In various embodiments of the invention, the communication between the user input device and the wirelessly enabled host complies with the Bluetooth wireless communication standard. In particular, for embodiments of the present invention relating to communications systems implementing the Bluetooth standard, a method and apparatus is disclosed for generating communication frequencies based on modulo 23 and modulo 79 solutions for various input variables.

In one embodiment of the present invention, a communication frequency is generated based on a modulo 23 solution for an input variable. In this embodiment, the input variable is received and an intermediate modulo 23 solution is generated by: generating a binary representation of the input variable; using the five rightmost digits of the binary representation of the input variable to represent a first intermediate remainder (R'); using the remaining leftmost digits to represent a first intermediate quotient (Q'); expressing the first intermediate modulo solution as a sum of the first intermediate quotient (Q') multiplied by 9 plus the first intermediate remainder (R'); and comparing the first intermediate modulo solution to the quantity 32. The first intermediate remainder (R') is indicated as the modulo remainder (R) if the quantity of the first intermediate modulo solution is less than 32 and the modulo remainder is used to generate a communication frequency. If the quantity of the intermediate remainder (R') is not less than 32, an iterative calculation is performed using the aforementioned processing steps and the new intermediate solution is again compared to the quantity 32. The iterative process is continued until the resulting intermediate solution is less than 32.

In another embodiment of the present invention, a communication frequency is generated based on a modulo 79 solution for an input variable. In this embodiment, the input variable is received and an intermediate modulo 79 solution is generated by: generating a binary representation of the input variable; using the seven rightmost digits of the binary representation of the input variable to represent a first intermediate remainder (R'); using the remaining leftmost digits to represent a first intermediate quotient (Q'); expressing the first intermediate modulo solution as a sum of the first intermediate quotient (Q') multiplied by 49 plus the first intermediate remainder (R'); and comparing the first intermediate modulo solution to the quantity 128. The first intermediate remainder (R') is indicated as the modulo remainder (R) if the quantity of the first intermediate modulo solution is less than 128 and the modulo remainder is used to generate a communication frequency. If the quantity of the intermediate remainder (R') is not less than 128, an iterative calculation is performed using the aforementioned processing steps and the new intermediate solution is again compared to the quantity 128. The iterative process is continued until the resulting intermediate solution is less than 128.

The modulo 23 and modulo 79 embodiments described herein can be used in a wireless communication system based on the Bluetooth standard. The wireless communication system is broadly comprised of a transceiver having a radio frequency module and a baseband core that includes a frequency control functionality. A frequency hopper within the baseband core of the transceiver is operable to generate a plurality of communication frequencies based on the modulo 23 and modulo 79 solutions described herein.

Moreover, other aspects of the present invention will become apparent with further reference to the drawings and specification, which follow.

DETAILED DESCRIPTION OF THE DRAWINGS

Figure 1A:
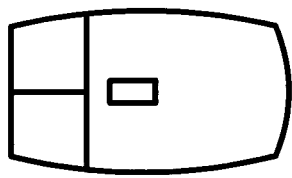
FIG. 1A is a system diagram illustrating a PC host and a wireless mouse that includes a wireless interface device constructed according to the present invention.
Figure 1A:
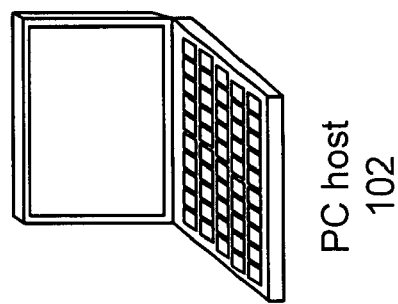

FIG. 1A is a system diagram illustrating a PC host 102 and a wireless mouse 104 that includes a wireless interface device constructed according to the present invention. As shown in FIG. 1A, the PC host 102 wirelessly couples to the wireless mouse 104. In the structure of FIG. 1A, the wireless mouse 104 includes a wireless interface device that operates to place the wireless mouse in any of a number of reduced power operating modes, including a power down mode in which battery life is substantially extended.

Figure 1B:
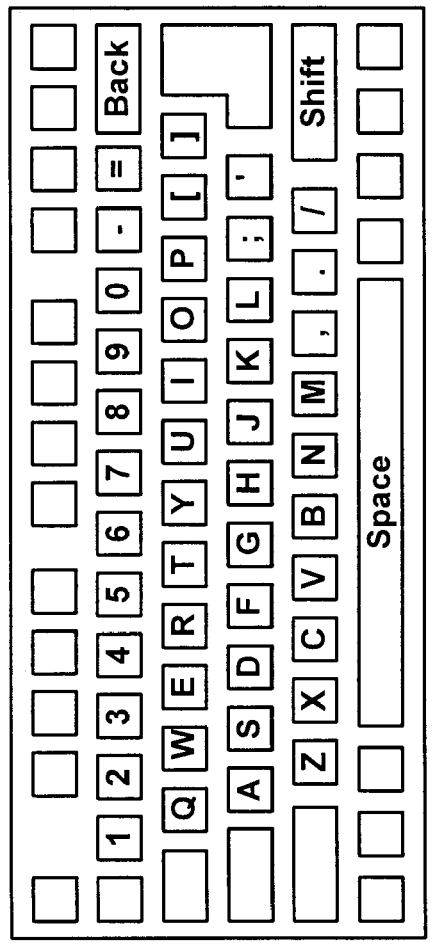
FIG. 1B is a system diagram illustrating a PC host and a wireless keyboard that includes a wireless interface device constructed according to the present invention.
Figure 1B:
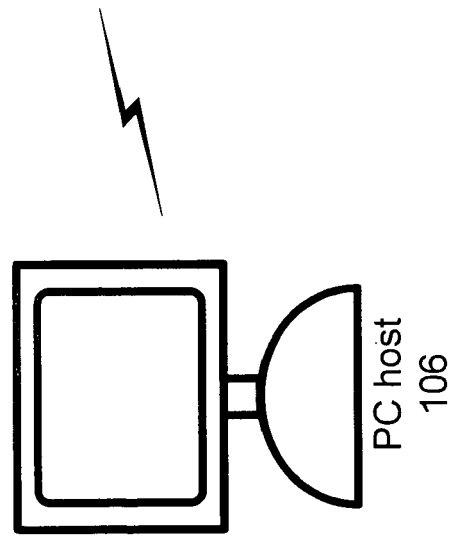

FIG. 1B is a system diagram illustrating a PC host 106 and a wireless keyboard 108 that includes a wireless interface device constructed according to the present invention. The wireless keyboard 108 is battery powered and operates for extended periods of time on a single set of batteries because of the greatly reduced power consumption operations according to the present invention.

Figure 2:
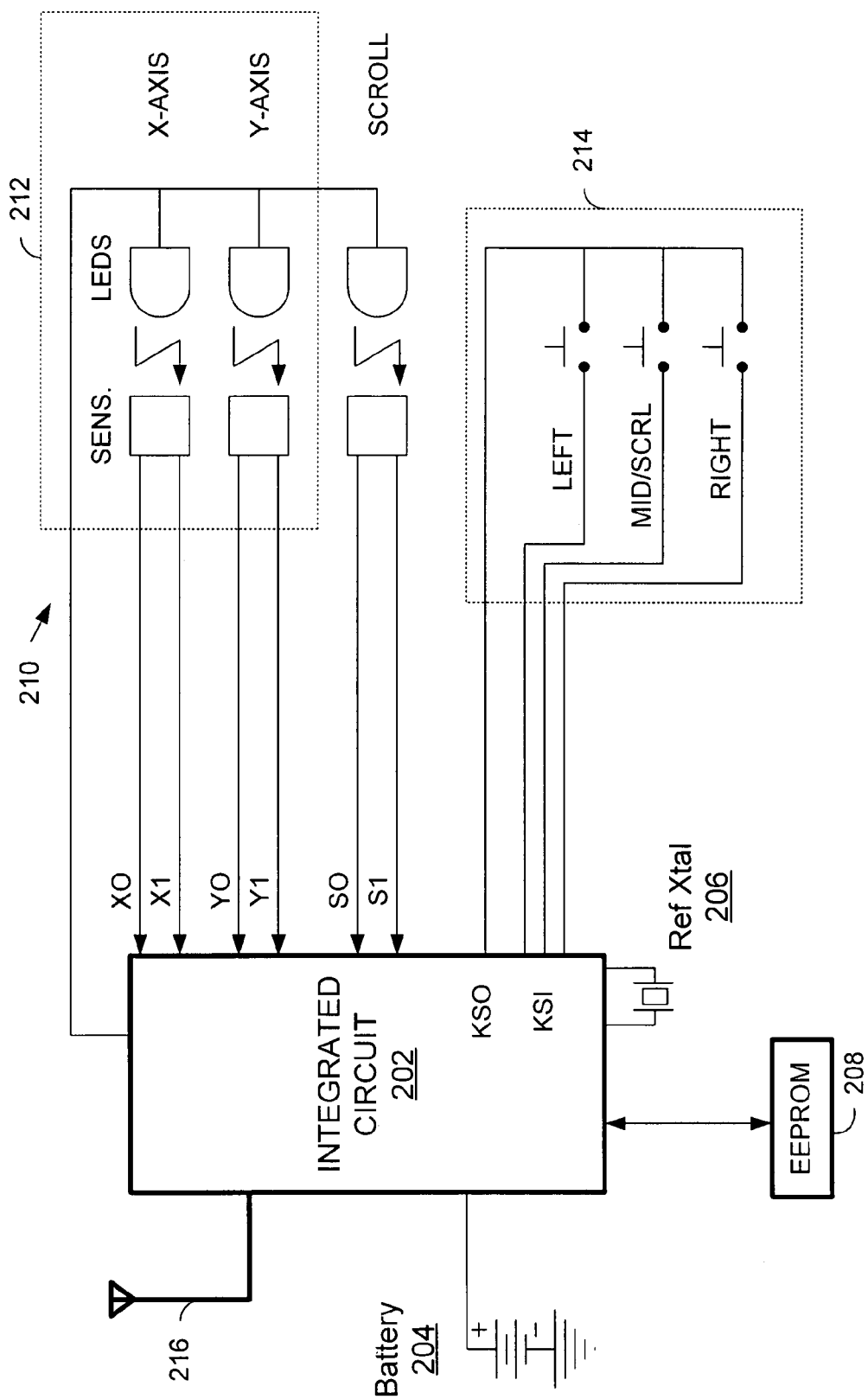
FIG. 2 is a schematic block diagram illustrating the structure of a wireless mouse that includes a wireless interface device constructed according to the present invention.

FIG. 2 is a schematic block diagram illustrating the structure of a wireless mouse that includes a wireless interface device constructed according to the present invention. An integrated circuit 202 constructed according to the present invention serves as the wireless interface device and couples to various mouse inputs 210. These mouse inputs 210 include x-axis and y-axis inputs as well as a scroll input. The x-axis and y-axis inputs are often referred to a "quadrature" inputs. The components that produce the quadrature inputs are generally referred to at numeral 212 and may be constructed from optical inputs instead of from conventional mechanical inputs. Referenced via numeral 214 are the button inputs that are typical with a computer mouse and include the left button input, the middle/scroll button input, and the right button input. As is shown, each of the signals produced by the mouse are received by integrated circuit 202.

Integrated circuit 202 also couples to battery 204, crystal 206 that produces a 12 MHz reference frequency, EEPROM 208, and antenna 216. In one embodiment of the present invention, battery 204 comprises a pair of either AA batteries or AAA batteries. Antenna 216 is an internal antenna in the described because of the size constraints of the mouse and because of the relatively short distance between the PC host and the wireless mouse.

Figure 3:
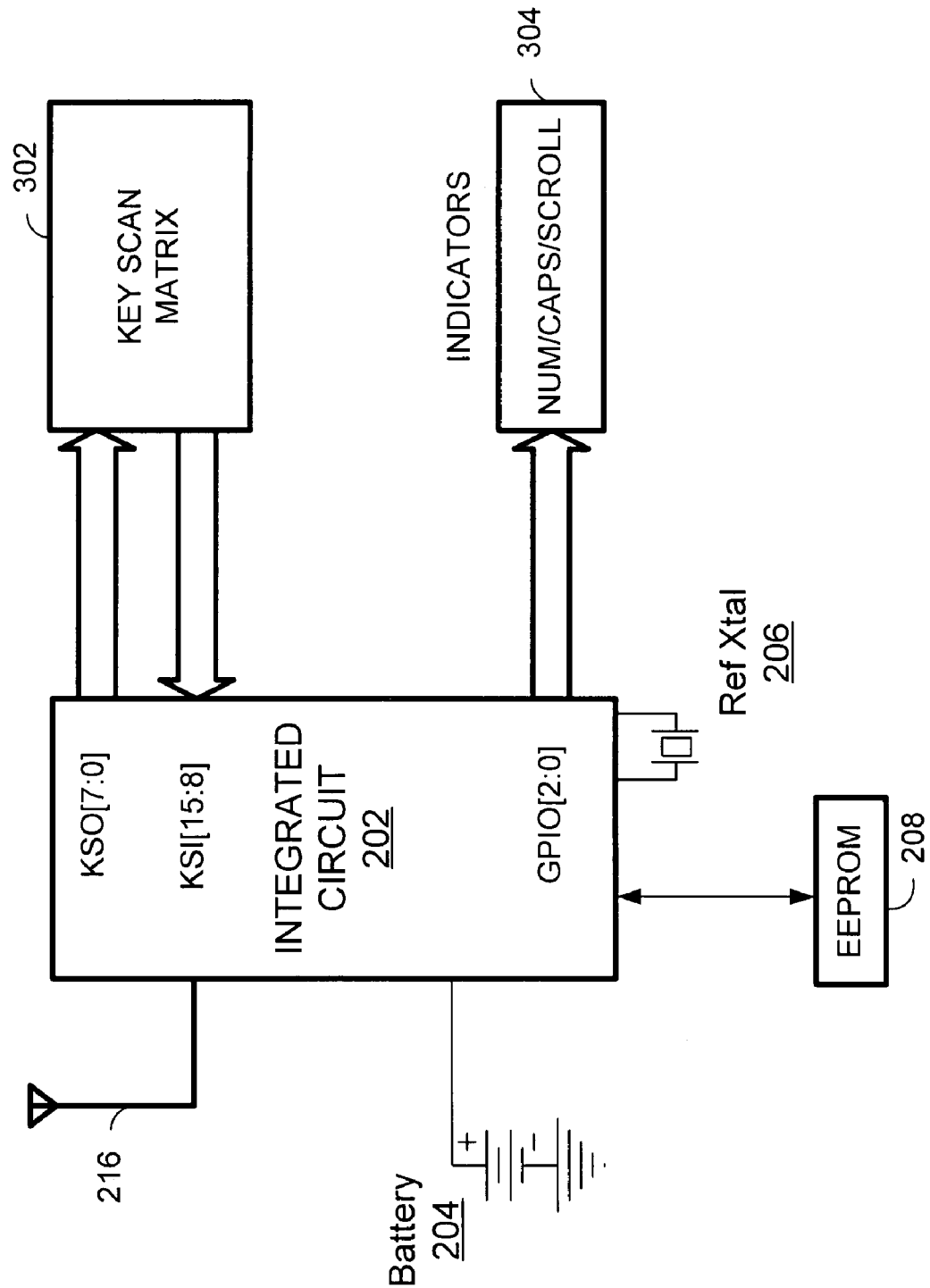
FIG. 3 is a schematic block diagram illustrating the structure of a wireless keyboard that includes a wireless interface device constructed according to the present invention.

FIG. 3 is a schematic block diagram illustrating the structure of a wireless keyboard that includes a wireless interface device (integrated circuit 202) constructed according to the present invention. As shown in FIG. 3, integrated circuit 202 services a key scan matrix 302 that provides inputs from the keyboard. Indicators 304 include number, capitals, and scroll lights that are lit on the keyboard. The integrated circuit 202 couples to a battery 204, a crystal 206, an EEPROM 208, and an antenna 216.

In another embodiment (not shown in either FIG. 2 or FIG. 3), the integrated circuit 202 services both mouse and keyboard input and may reside internal to either the mouse or the keyboard. As will be apparent to those skilled in the art, multiplexing or signal sharing may be required, because the input signal differs. However, different signal lines may be dedicated for keyboard and for mouse inputs such that no signal sharing is required. As is apparent, when the integrated circuit 202 alone services both mouse and keyboard, input wired connectivity between the keyboard and the mouse is required.

Figure 4:
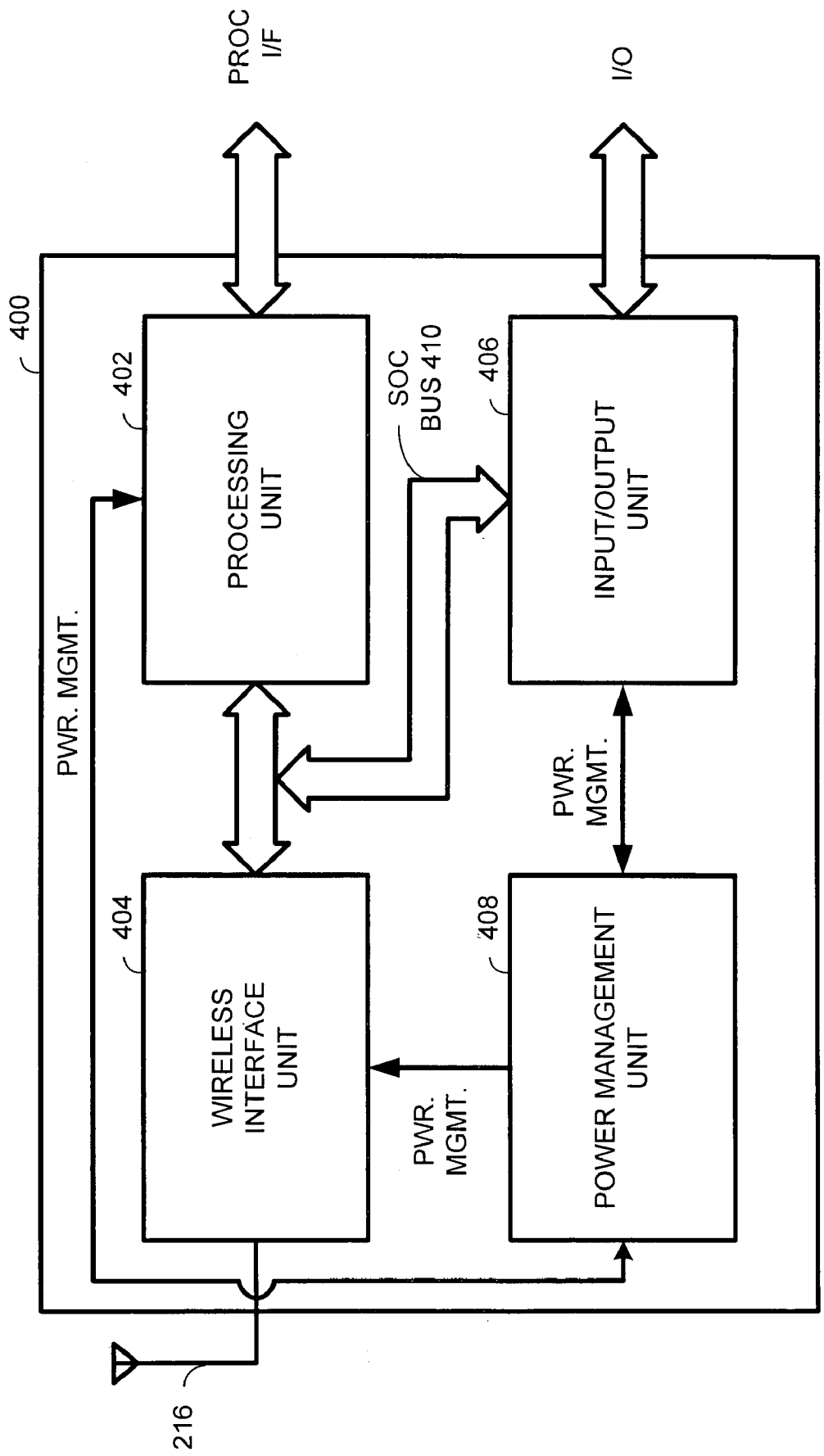
FIG. 4 is a block diagram illustrating a wireless interface device (integrated circuit) constructed according to the present invention.

FIG. 4 is a block diagram illustrating a wireless interface device (integrated circuit) constructed according to the present invention. As shown in FIG. 4, the wireless interface device 400 includes a processing unit 402, a wireless interface unit 404, an input/output unit 406, and a power management unit 408. The wireless interface unit 404 couples the wireless interface device 400 to antenna 216. The wireless interface unit 404 can be adapted to operate according to the Bluetooth specification and in particular to the Human Interface Device (HID) portion of the Bluetooth specification. It will be understood by those skilled in the art, however, that the present invention can be adapted to work in conjunction with other wireless interface standards. Processing unit 402, wireless interface unit 404, and input/output unit 406 couple with one another via a system on a chip (SOC) bus 410. Processing unit 402 includes a processing interface that may be used to couple the processing unit to one or more devices.

Figure 5:
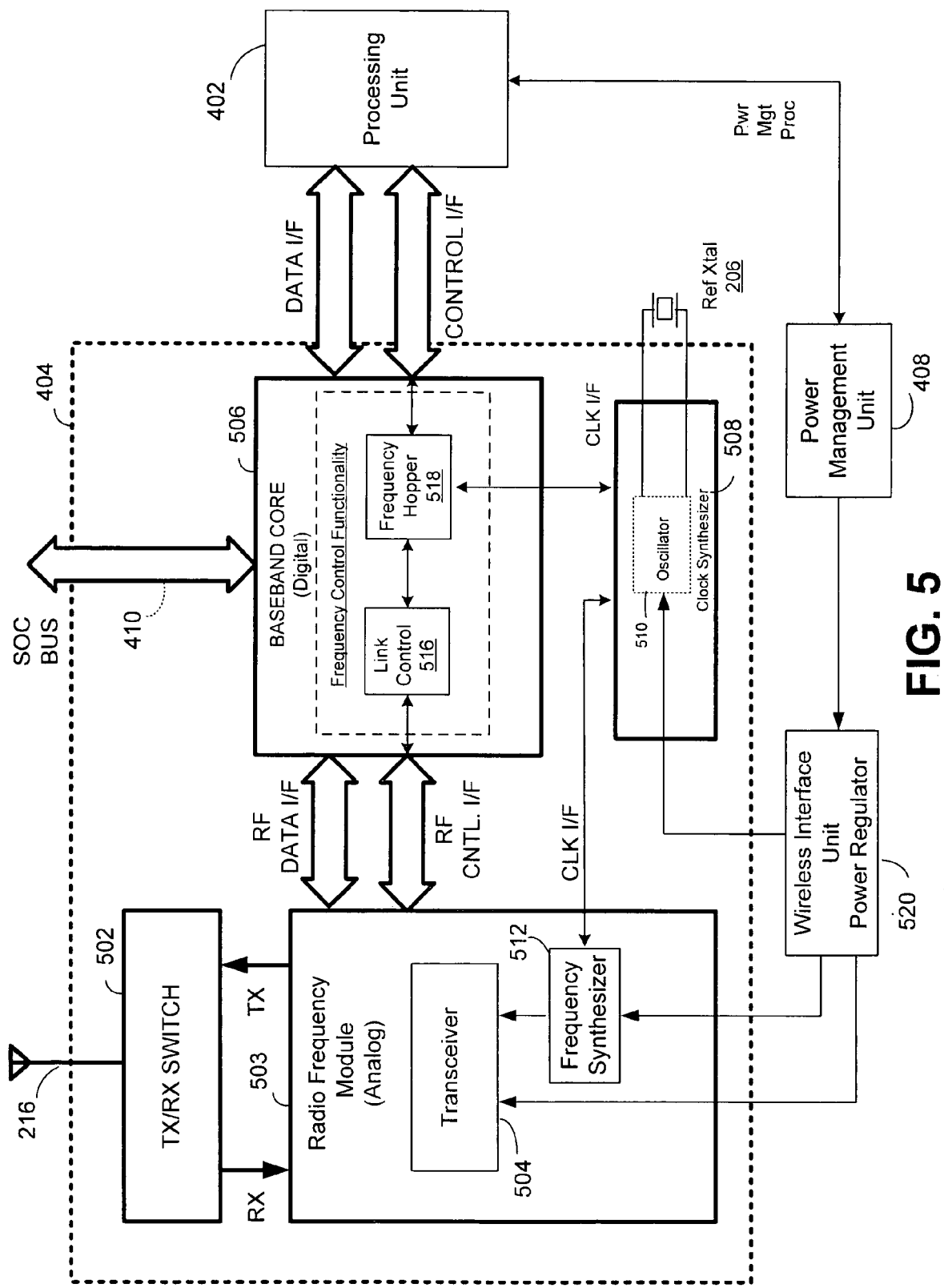
FIG. 5 is a block diagram illustrating a wireless interface unit of the wireless interface device of FIG. 4.

FIG. 5 is a block diagram illustrating a wireless interface unit of the wireless interface device of FIG. 4. The wireless interface unit 404 includes a transmit/receive switch 502, a radio frequency module 503 that comprises a 2.4 GHz transceiver 504, a baseband core 506 which may be compatible with the Bluetooth standard, and a frequency synthesizer 512. Operation of the various system modules illustrated in FIG. 5 is controlled by the processor 402 using appropriate data interfaces and control interfaces understood by those of skill in the art. The baseband core 506 provides a frequency control functionality that comprises a link control 516 and a frequency hopper 518. Calculation of the appropriate modulo arithmetic solution to support operation of the frequency hopper 518 will be discussed in greater detail below in connection with the flowcharts illustrated in FIGS. 11A-11C. The aforementioned frequency control components communicate with the radio frequency module via the RF control interface to control operation of the frequency synthesizer 512, thereby causing the transceiver 504 to communicate on the appropriate frequency. Each of these components is generally known in the field and will be described in minimal detail herein.

The transmit/receive switch 502 couples to antenna 216 and switches between transmit and receive operations. The 2.4 GHz transceiver 504 performs all RF front-end operations and operates within a frequency band and on particular channels as are specified by the Bluetooth operating standard. The 2.4 GHz transceiver 504 couples to baseband core 506. Such coupling is performed via an RF control interface and an RF data interface. The RF control interface performs the necessary control operations to guarantee that the 2.4 GHz transceiver 504 and the baseband core 506 will operate consistently within desired operating specifications. The RF data interface transfers both Rx and Tx data between the 2.4 GHz transceiver 504 and the baseband core 506. Clock synthesizer 508 comprises an oscillator 510 that couples to the external crystal 206 operating at 12 MHz, and to the phase-locked loop (PLL) 512. The clock synthesizer 508 is controlled to provide an RF frequency for the 2.4 GHz transceiver 504 which is used to mix with the baseband signal received from the baseband core during a transmit operation and to mix with the received RF signal during a receive operation. The clock synthesizer 508 operates in conjunction with the power management unit 408, via the wireless interface unit voltage regulator 520, to provide different clock signals corresponding to different power states as discussed herein below.

Figure 6:
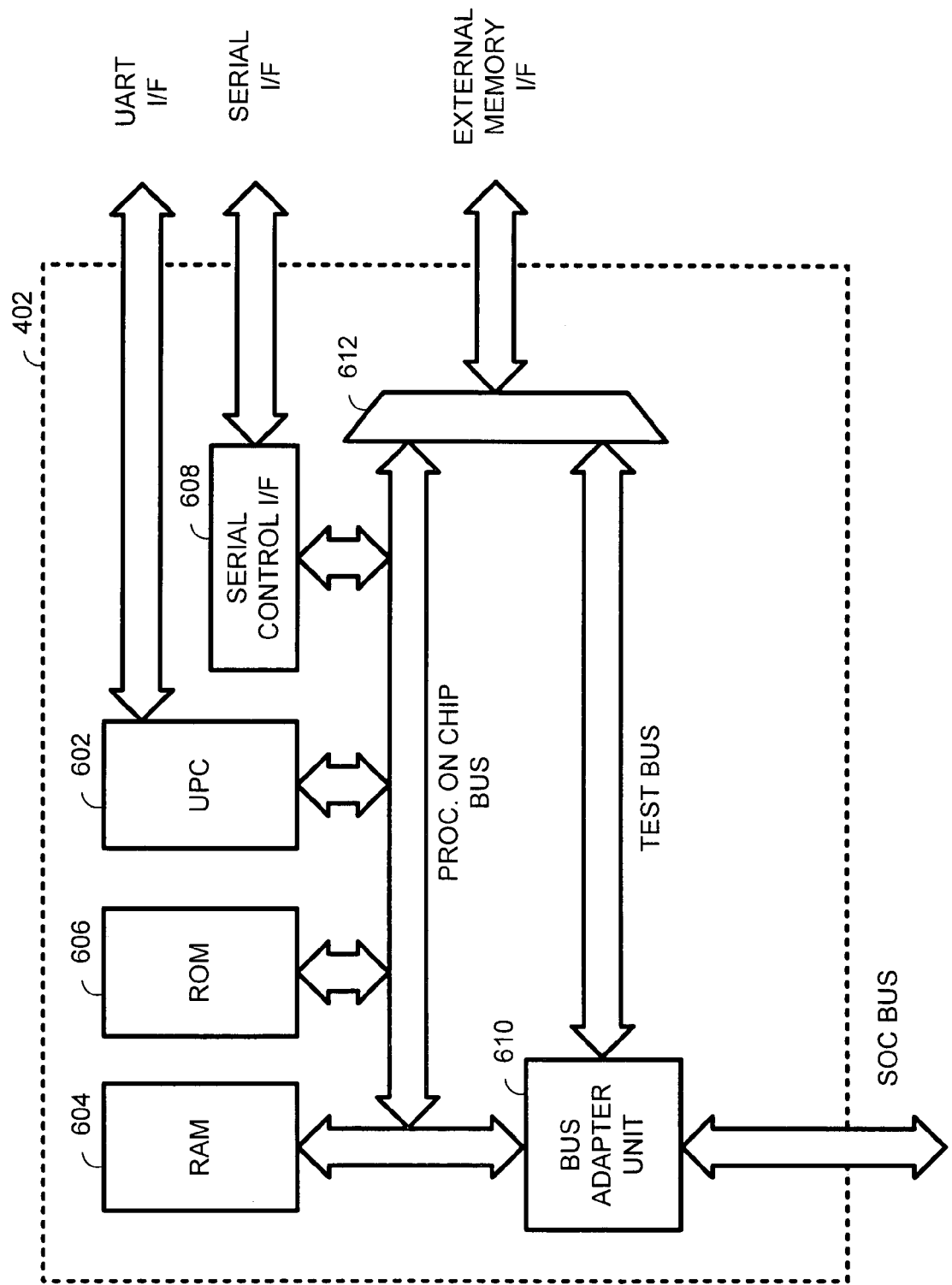
FIG. 6 is a block diagram illustrating a processing unit of the wireless interface device of FIG. 4.

FIG. 6 is a block diagram illustrating a processing unit 402 of the wireless interface device of FIG. 4. The processing unit 402 includes a microprocessor core 602, read only memory 606, random access memory 604, serial control interface 608, bus adapter unit 610, and multiplexer 612. The microprocessor core 602, ROM 606, RAM 604, serial control interface 608, bus adapter unit 610, and multiplexer 612 couple via a processor on a chip bus. Multiplexer 612 multiplexes an external memory interface between the processor on a chip bus and a test bus. The bus adapter unit 610 interfaces the processor on a chip bus with the SOC. The microprocessor core 602 includes a universal asynchronous receiver transmitter interface that allows direct access to the microprocessor core. Further, the serial control interface 608 provides a serial interface path to the processor on a chip bus.

Figure 7:
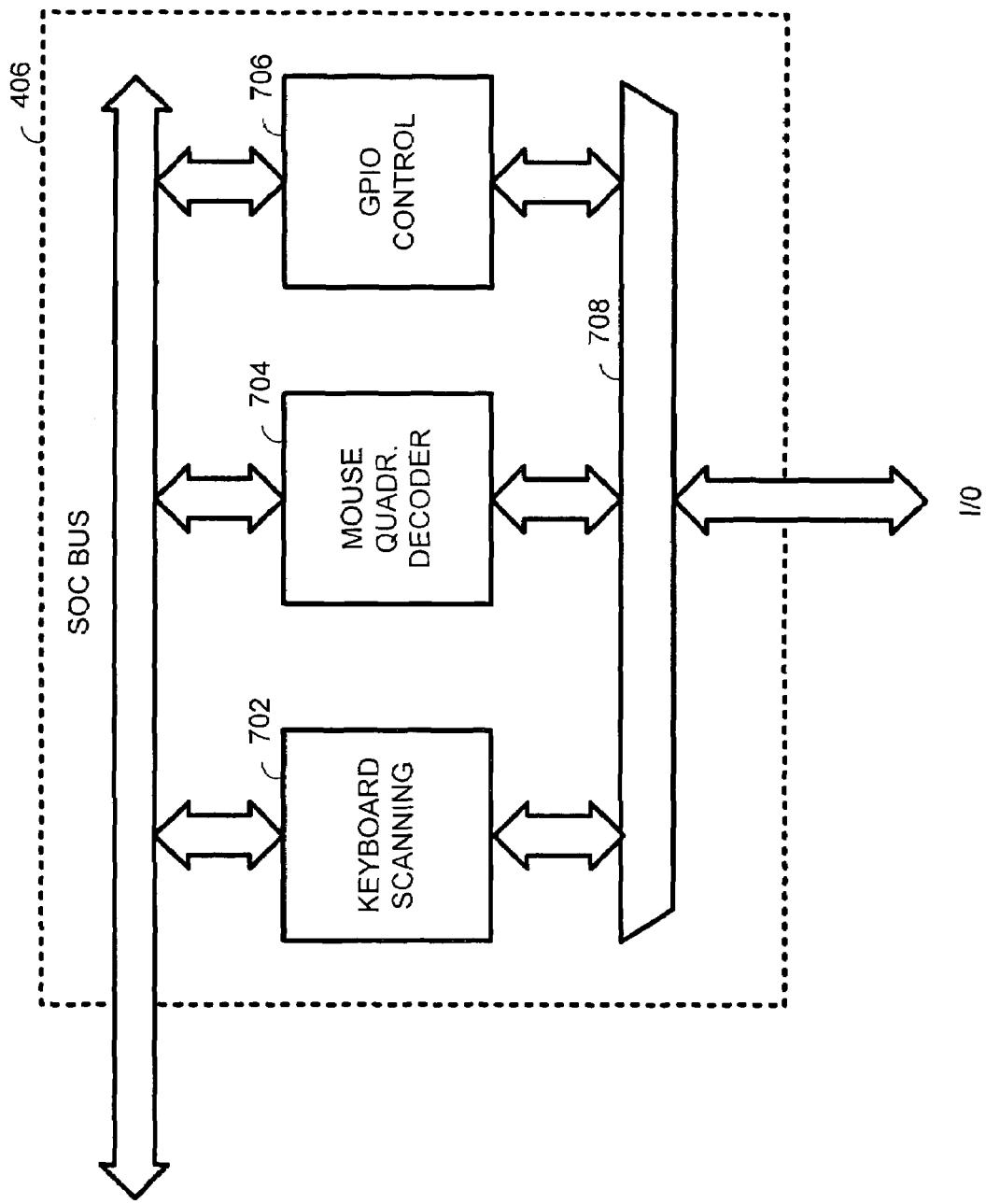
FIG. 7 is a block diagram illustrating an input/output unit of the wireless interface device of FIG. 4.

FIG. 7 is a block diagram illustrating an input/output unit 406 of the wireless interface device of FIG. 4. The input/output unit 406 includes a keyboard scanning block 702, a mouse quadrature decoder block 704, and a GPIO control block 706. Each of the keyboard scanning block 702, the mouse quadrature decoder block 704, and the GPIO control block 706 couple to the SOC bus. Further, each of the keyboard scanning block 702, the mouse quadrature decoder block 704, and the GPIO control block 706 couple to I/O via multiplexer 708. This I/O couples to the at least one user input device.

In another embodiment of the input/output unit 406, each of the keyboard scanning block 702, the mouse quadrature decoder block 704, and the GPIO control block 706 couples directly to external pins that couple to the at least one user input device.

Figure 8:
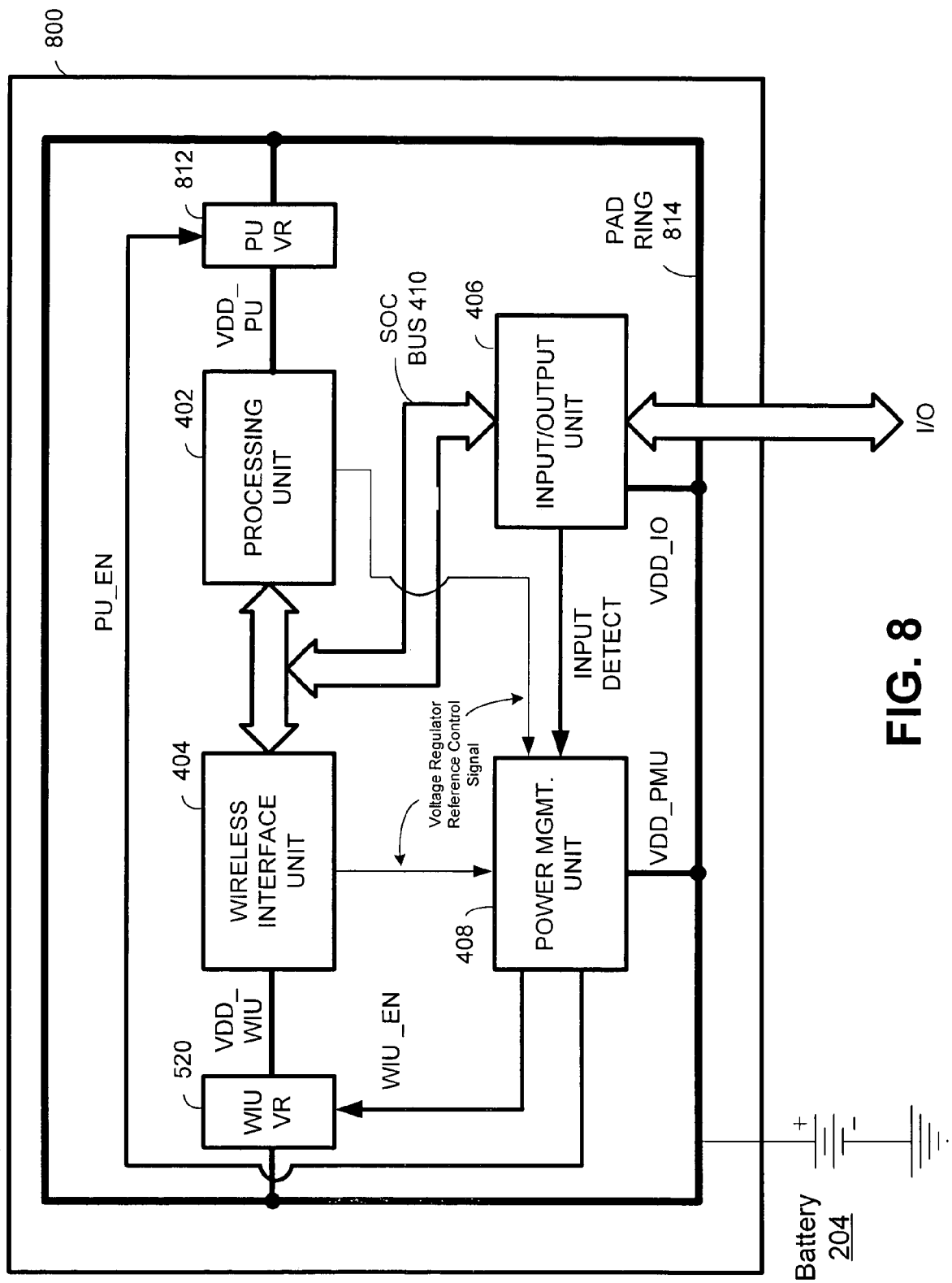
FIG. 8 is a block diagram generally showing the structure of an integrated circuit constructed according to the present invention with particular detail in the coupling of battery power to the units of the device.

FIG. 8 is a block diagram generally showing the structure of an integrated circuit constructed according to the present invention with particular detail in the coupling of battery power to the units of the device. Integrated circuit 800 of FIG. 8 includes a wireless interface unit 404, processing unit 402, input/output unit 406, and power management unit 408. The processing unit 402, wireless interface unit 404, and input/output unit 406 couple via a SOC bus 410. Further, as was previously described, input/output unit 406 couples to at least one user input device via I/O connection.

With the integrated circuit 800 of FIG. 8 a pad ring 814 surrounds a substantial portion of the components of the integrated circuit. The pad ring 814 couples directly to battery 204, which powers the pad ring. Further, input/output unit 406 and power management unit 408 couple directly to pad ring 814 to receive their power and voltage. However, processing unit 402 couples to pad ring 814 via processing unit-voltage regulation circuitry 812. Further, the wireless interface unit 404 couples to pad ring 814 via wireless interface unit voltage regulation circuitry 520. The processing unit voltage regulation circuitry 812 is controlled by the power management unit 408 via control signal PU_EN. Further, the wireless interface unit voltage regulation circuitry 520 is controlled by the power management unit 408 using control signal WIU_EN.

The integrated circuit operates in four different power-conserving modes: (1) busy mode; (2) idle mode; (3) suspend mode; and (4) power down mode. Busy mode, idle mode, and suspend mode are described in the Bluetooth specification. However, power down mode is unique to the present invention.

In busy mode mode, the master (host computer) is actively polling the HID (wireless mouse, wireless keyboard, etc.) for data at a polling rate near 100 polls/second, or about once every 16 slot times. Continued user activity (keypad strokes, mouse motion, button presses, etc.) keeps the HID in busy mode. If there has been no activity for a few seconds (determined by particular settings), operation transitions to idle mode.

In idle mode, the HID requests the master (serviced host) to enter SNIFF mode with a SNIFF interval that is chosen based on desired latency and average power consumption. In one operation, the SNIFF interval is 50 ms, or about every 80 slot times. Although the HID can I/O Active immediately after an event, it may have to wait up to 100 mS to transmit its data to the host, and therefore must have enough buffer space to store 100 mS of events. If an event occurs, the HID requests the master to leave SNIFF mode. If there is no further activity for a longer period, the HID transitions from idle mode to suspend mode. Then, the HID is parked.

In suspend mode, a longer beacon interval can be used for a lower power state. When in suspend mode, any user input detected will result in the HID requesting to be unparked and transitioned back to the busy mode. When the HID is parked, it consumes less power than when the host is in SNIFF mode since the HID does not have to transmit. In suspend mode, the HID just listens to the beacons to remain synchronized to the master's frequency hopping clock. As long as the master continues transmitting (meaning the host is not turned off) the HID will remain in suspend mode. If link loss occurs due to the host being turned off without warning, or the host moving out of range, the Lost Link state will be entered.

According to the present invention, the power down mode is also supported. In the power down mode, the power management unit 408 operates the processing unit voltage regulation circuitry 812 and the wireless interface unit voltage regulation circuitry 520 to power down the processing unit 402 and wireless interface unit 404, respectively. These states of operation will be described further with reference to FIGS. 9 and 10.

Figure 9:
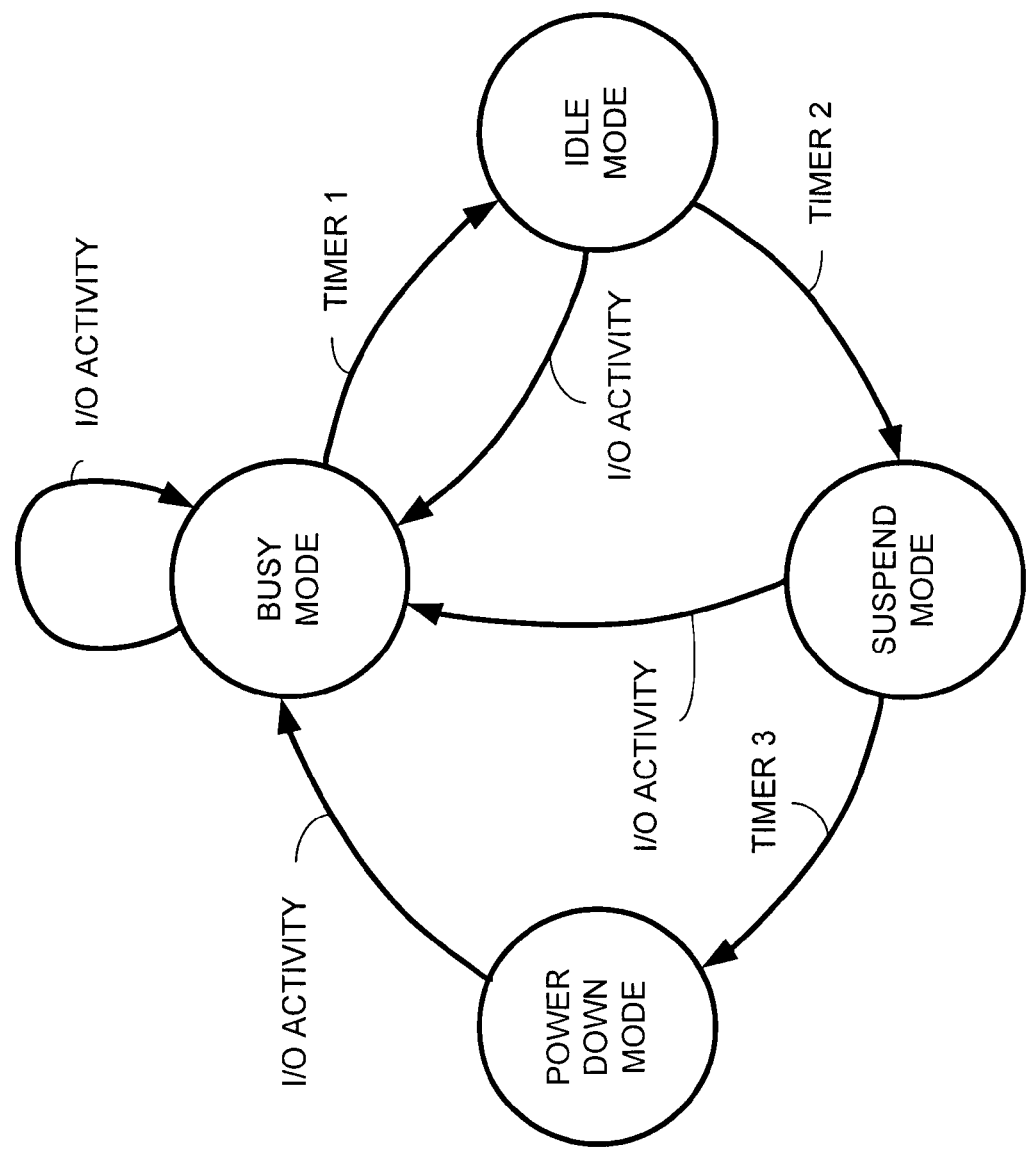
FIG. 9 is a logic diagram illustrating operation according to the present invention.

FIG. 9 is a logic diagram illustrating operation according to the present invention. As illustrated in FIG. 9, a wireless interface device operating according to the present invention operates in four separate power-conserving modes. These power conservation modes include the busy mode, the idle mode, the suspend mode, and the power down mode. The state diagram of FIG. 9 shows how each of these modes is reached during normal operation.

When the wireless interface device is initially powered up, it enters the busy mode of operation. In the busy mode of operation, all features and wireless operations of the wireless interface device are enabled. As long as I/O activity continues, the wireless interface device remains in the busy mode. However, after expiration of a first timer with no I/O activity, the operation moves from the busy mode to the idle mode. Operation will remain in idle mode until the expiration of a second timer or until I/O activity occurs.

If while in the idle mode I/O activity occurs, operation returns to the busy mode. If in the idle mode, if timer 2 expires with no additional I/O activity, suspend mode is entered. While in suspend mode, if I/O activity occurs, operation returns to busy mode. However, if in suspend mode, no additional I/O activity occurs until the expiration of a third timer, power down mode is entered. While in the power down mode, operation will remain in the power down mode until I/O activity occurs. When I/O activity occurs, operation of the wireless interface device will move from the power down mode to the busy mode.

Figure 10:
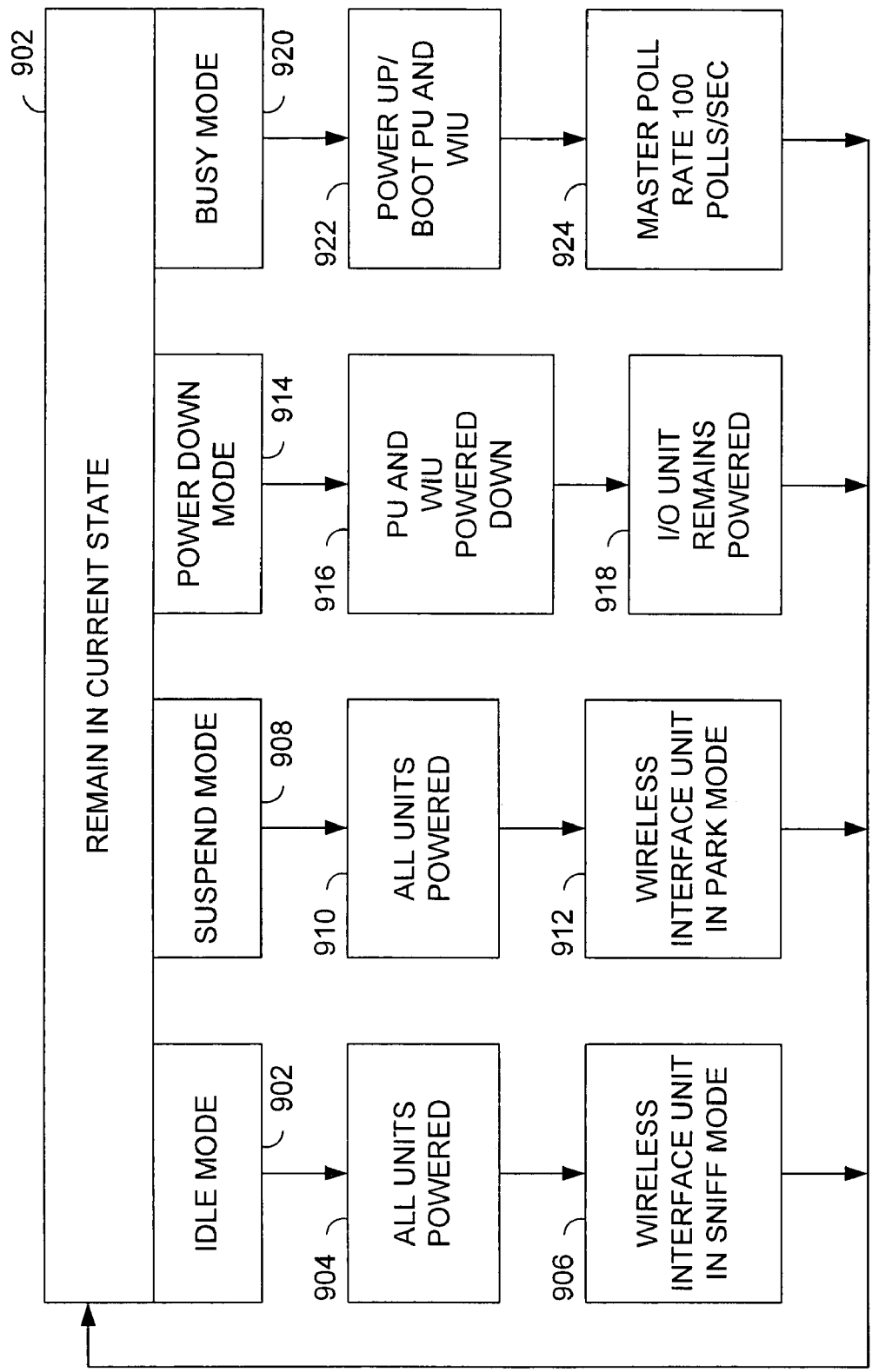
FIG. 10 is a logic diagram illustrating operation according to the present invention in controlling the power consumption of a serviced device.

FIG. 10 is a logic diagram illustrating operation according to the present invention in controlling the power consumption of a serviced device. As shown in FIG. 10, once operation in a particular power conservation state, e.g., busy mode, idle mode, suspend mode, and power down mode has commenced, operation will remain in that state until expiration of respective timer or I/O activity occurs (step 902).

When power conservation operation occurs to move from the busy mode to the idle mode (step 902), all portions of the wireless interface device remain powered (step 904). However, in the idle mode, the wireless interface unit enters a SNIFF mode in which some of its operations are reduced. Such operations were previously described with reference to FIG. 9. Further, additional information regarding this mode is available in the Bluetooth HID standard.

When the operation of the wireless interface device transitions from the idle mode to the suspend mode (step 908), all portions of the wireless interface device remain powered (step 910). However, the wireless interface unit of the wireless interface device enters the park mode, which consumes even less power than does the wireless interface unit when in the sniff mode.

When in the suspend mode, if an additional timer or inactivity period expires, the wireless interface device will transition to the power down mode (step 914). In the power down mode, the processing unit and wireless interface unit will be powered down (step 916). This power down operation will be performed in one embodiment by simply disconnecting a voltage source from the processing unit in the wireless interface unit. One such technique for doing this is described with reference to FIG. 8. In the power down mode, the I/O unit will continue to be powered to allow it to sense the state of the user input device lines.

Finally, from any of the reduced power operating states, when I/O activity is sensed by the I/O block, the wireless input device will transition back to the busy mode (step 920). When such operation occurs, if the components have been powered down, they will be a powered up and will go through their boot operations (step 922). Then, in the busy mode, the wireless interface unit will operate in its normal state in which the master wireless device, i.e., wirelessly enabled host will poll the wireless interface device at 100 times per second. From each of steps 906, 912, 918, and 924, operation returns to step 902 wherein the current power conservation state will be kept until another event occurs.

Figure 11A:
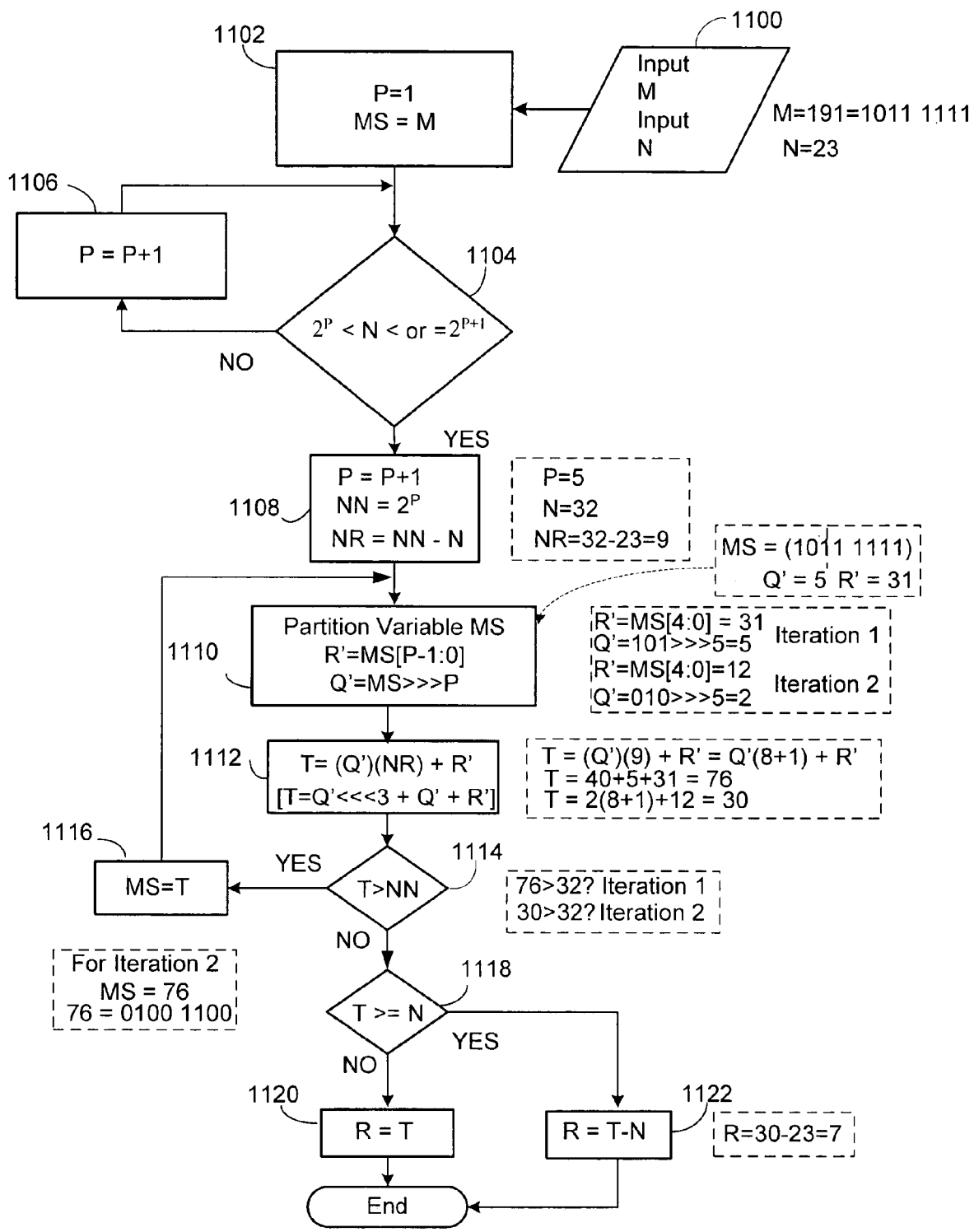
FIG. 11A is a flowchart illustrating the processing steps implemented by the wireless interface to generate a modulo arithmetic solution for use in generating a frequency hopping sequence.
Figure 11B:
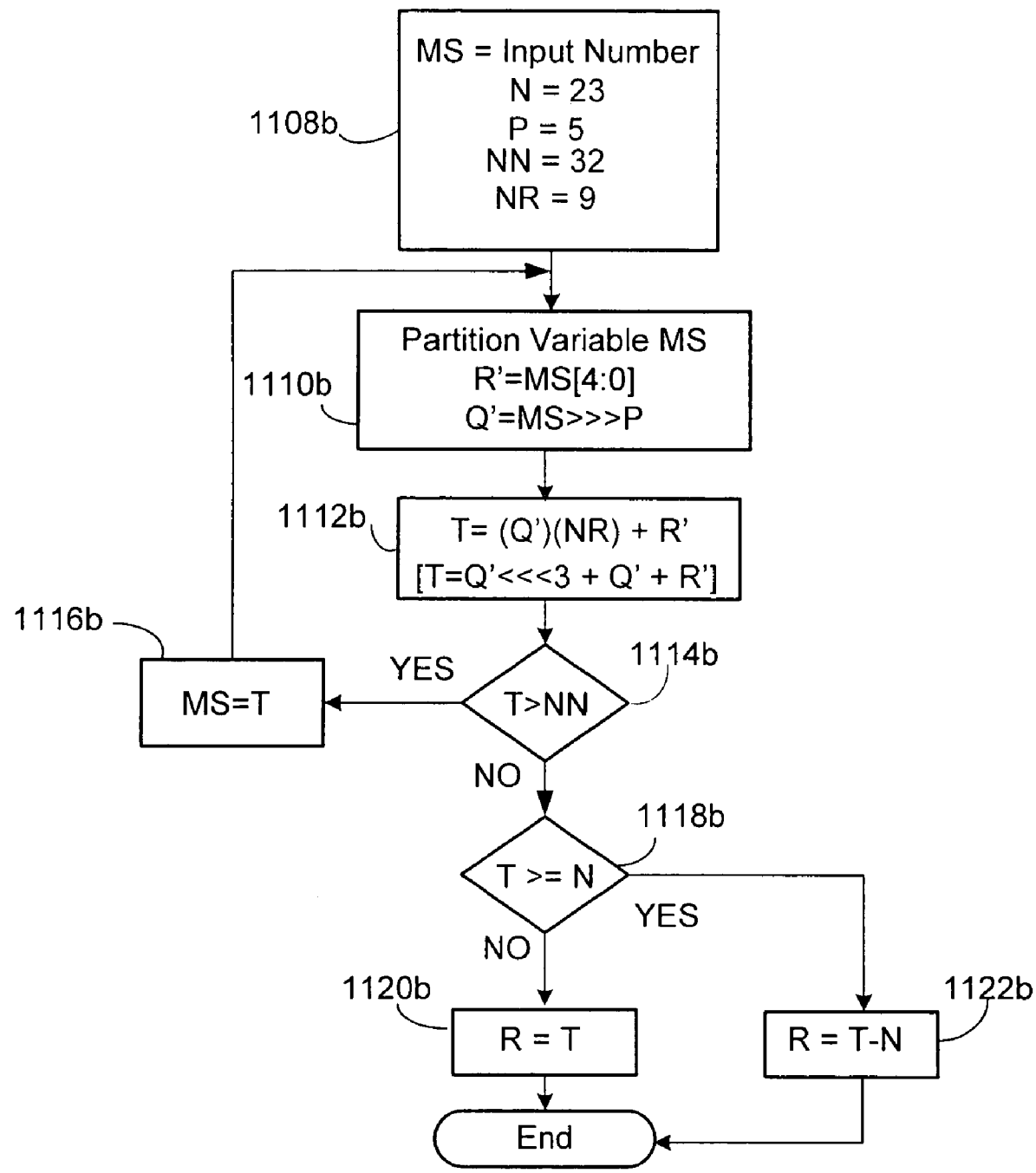
FIG. 11B is a flowchart illustrating the processing steps implemented by the wireless interface to generate a modulo 23 solution for use in generating a frequency hopping sequence.
Figure 11C:
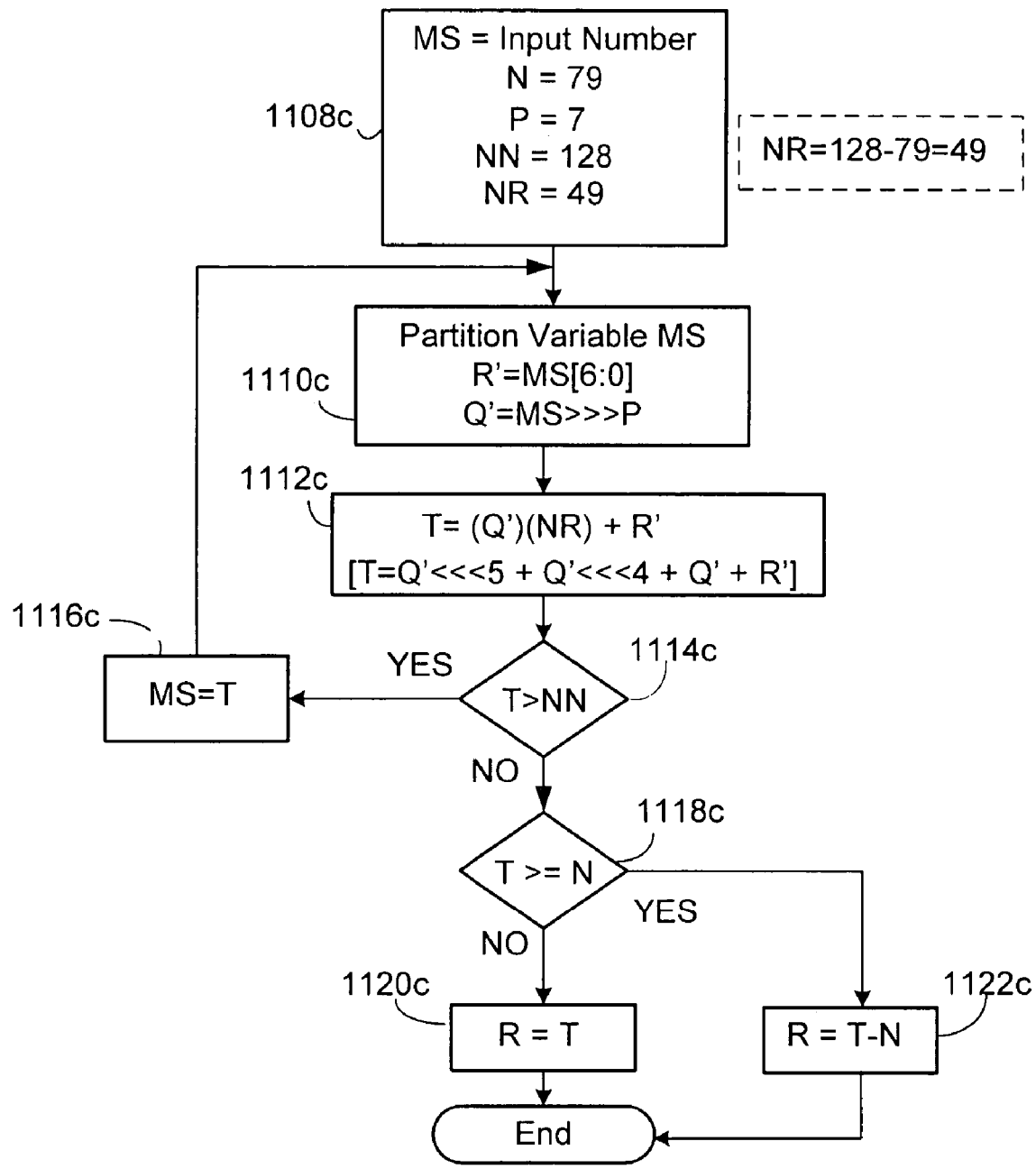
FIG. 11C is a flowchart illustrating the processing steps implemented by the wireless interface to generate a modulo 79 solution for use in generating a frequency hopping sequence.

Operation of the system for providing an efficient and accurate derivation of a modulo arithmetic solution for use in frequency selection via the frequency hopper 518 can be understood by reference to the processing steps illustrated in the flowcharts depicted in FIGS. 11A-11C. Prior to discussing the processing steps illustrated in the aforementioned flowcharts, however, specific examples of modulo arithmetic calculations will be discussed to aid in the understanding of the processing steps implemented in the present invention.

Calculation of a modulo solution for a frequency hop operation can be understood by considering a Modulo 23 and a Modulo 79 calculation related to the Bluetooth specification. For each of these examples, an number M can be expressed by the formula:

$$M = R(\text{mod } N),$$

where N corresponds to the Modulo (e.g. 23 or 79) and R is the remainder. As an example of a Mod 23 solution, the processing steps for M=191 are discussed below. Since it is efficient to operate in powers of 2 when performing calculations with a digital processor, M can be expressed as:

$$M = (Q')(32) + R'$$

Where Q' represents a temporary quotient estimate and R' represents a temporary remainder estimate.

Thus, $$M = (Q')(23+9) + R' \text{ and}$$

$$M(Q')(23) + (Q')(9) + R' \quad [\text{Equation A}]$$

From Equation A, the value of (Q')(23) can be discarded and the intermediate result can be derived by adding (Q')(9) to R'. As will be discussed in detail below in connection with the flowchart illustration, the result of this calculation is compared to 32, since 32 is the next higher power of 2 compared to the modulo (23). If the intermediate result is not less than 32, the same iterative modulo 32 operation is performed until the result of the (Q')(9)+R' is smaller than 32. Once this result has been achieved, the solution is simply (Q')(9)+R' if this sum is also smaller than 23; otherwise, the answer is (Q')(9)+R'−23.

The specific example for M=191 will now be illustrated. As discussed above, M can be expressed as M=(Q')(9)+R', where the quantity 32 in this example can be represented by $2^P$, where P=5.

Thus, for M=191, find M=R(Mod 23)

[i] 191 =(1011 1111) in binary form.

The value of R' is determined by the rightmost P digits. Therefore,

R'=31

The value of Q' is determined by the leftmost remaining (three) digits. Therefore,

Q'=5

Since (Q')(9)+R'=45+31=76>32, it is necessary to perform the iterative Mod 32 calculation again.

[ii] 76=(0100 1100) in binary form.

The value of R' is again determined by the rightmost P digits. Therefore,

R'=12

The value of Q' is determined by the leftmost remaining (three) digits. Therefore, Qi=2

Since (Q')(9)+R"=18+12=30<32 and since 30>23, the answer is 30−23=7.

Operation of the system for providing an efficient and accurate derivation of a modulo result can be understood by referring to the flow chart of FIG. 11A and the related system components shown in FIG. 5. In step 1100, operating variables are initialized. These initial variables include the variable "M" that corresponds to the number for which the modulo solution is sought and the variable "N" that corresponds to the modulo base. In step 1102, the variable P, which is the exponent value the binary operations discussed below, is initialized with a value of "1." Also, in step 1102, the variable MS is initialized to be equal to the value of the variable "M." In step 1104, a test is conducted to determine whether the value of the modulo is greater than $2^P$ and less-than-or-equal-to the $2^{P+1}$. If the result of the test conducted in step 1104 indicates that the value of the variable N is not within the specified range, the value of P is incremented in step 1106 and the test in step 1104 is repeated. The process of incrementing in step 1104 and testing in step 1106 is repeated until the test conducted in step 1104 indicates that the variable N is within the specified range. Once the test conducted in step 1104 indicates that the value of N is within the specified range, processing proceeds to step 1108 where the value of P is incremented by "1." Also, in step 1108, variable NN (New "N") is set to the value "$2^P$" and the variable NR, the modulo delta, is set equal to the quantity "NN−N." In step 1110, the variable MS is partitioned into two portions. The first portion corresponds to a temporary remainder estimate, R', that comprises the first "P" binary digits. As will be understood by those of skill in the art, the least significant digit corresponds to "$2^0$." The value of R' as defined by the "P" binary digits of the variable MS are designated, therefore, as MS[P−1:0]. The value of the temporary quotient estimate, Q', is calculated by "right-shifting" the remaining digits of MS to the right by "P" positions. The partitioning of MS can be better understood by considering an example with the initial value of MS=191 and with the variable P having a value of 5. The binary representation of 191 is 10111111. In step 1108, the value of R' would be determined by the digits corresponding to MS[(5−1):0] or MS[4:0]. As will be understood by those of skill in the art, the corresponding five digits will occupy the base 2 positions corresponding to $2^0$, $2^1$, $2^2$, $2^3$, and $2^4$. The value of R', therefore, will be a value of the first 5 binary digits, or 11111 resulting in a value of 31. The value of Q' is calculated using the remaining leftmost digits. These digits are shifted to the right by P positions. For example, using the three leftmost digits in the foregoing example, the value of P is 5. Shifting the value 101 to the right five times results in Q' having a numerical value of 5. In step 1112, an intermediate value of the modulo result is calculated. The variable T, representing the intermediate modulo result is calculated using the product equation T=(Q')(NR)+R'. In step 1114, a test is conducted to determine whether the value of the intermediate modulo result T is larger the value of the variable NN. If the result of the test conducted in step 1114 indicates that the, value of T is greater than the value of NN, steps 1110 and 1112 are repeated. If, however, the result of the test conducted in step 1114 indicates that the value of T is not greater than NN, processing proceeds to step 1118 where a test is conducted to determine whether the value of T is greater than or equal to the value of the variable N. If the result of this test indicates that the value of T is not greater than or equal to N, then the modulo remainder result is set equal to the value of the variable T in step 1120. If, however, the result of the test conducted in step 1114 indicates that the value of T is greater than or equal to N, the modulo remainder result is set equal to the value of T−N in step 1122.

While the flowchart above can be used for efficient generation of a modulo arithmetic solution for numerous modulo bases, there are two modulo calculations that are of particular interest in connection wireless devices implementing the Bluetooth standard. In particular, the Bluetooth standard comprises a pseudo-random sequence covering either 79 hops or 23 hops. The processing steps illustrated in FIG. 11A can be further simplified to provide an even more efficient modulo calculation directed to the 79 hop or the 23 hop pseudo-random sequence.

FIG. 11B is a flowchart illustration of the processing steps for implementing the method and apparatus of the present invention to generate a modulo 23 solution for use in generating a pseudo-random 23 hop sequence. Since it is known that the 23 lies between $2^4$ (=$16_{10}$) and $2^5$ (=$32_{10}$), it is not necessary to perform the iterative testing and incrementing of the value of P in steps 1104 and 1106 of FIG. 11A. Instead, the value of P is initialized at a known value equal to 5. Likewise, the value of the variable NR is a known value (32−23=9) for all modulo calculations and thus can be initialized at a value of 9 without the need for further calculation. The calculation in step 1110b is performed as discussed above in connection with step 1110 of FIG. 11A. In step 1112b, the calculation of the variable T can be simplified by representing the value of 9 as 8+1. Therefore, the calculation of the variable T can be performed by shifting the value of Q' left 3 times (the equivalent of multiplying by 8) and then adding the value of Q'+R'. The remaining steps illustrated in FIG. 11B are performed in the same manner as discussed above in connection with FIG. 11A. As will be understood by those of skill in the art, the method illustrated in FIG. 11B results in the determination of a modulo 23 solution with a minimum number of processing steps.

For a Mod 79 solution, where M=R (Mod79), M can be expressed as:

$$M=(Q')(128)+R'$$

$$M=(Q')(79+49)+R' \text{ and}$$

$$M=(Q')(79)+(Q')(49)+R' \text{[Equation } B\text{]}$$

Using the same methodology discussed above in connection with the Modulo 23 example, the (Q')(79) portion can be discarded and an iterative operation is performed on the (Q')(49)+R', i.e., if (Q')(49)+R' is greater than or equal to 128, an iterative Mod 128 operation is performed. If, however, (Q')(49)+R' is less than 128 and if (Q')(49)+R'<79, then the solution has been found. Otherwise, if (Q')(49)+R' is greater than or equal to 79, then the solution is R=(Q')(49)+R'−79.

An example where M=891 is illustrated below. As discussed above, M can be expressed as M=(Q')(128)+R', where the quantity 128 in this example can be represented by $2^P$, where P=7.

Thus, for M=891, find M=R(Mod 79)

[i] 891=(0011 0111 1011) in binary form.

The value of R' is determined by the rightmost P digits. Therefore,

R'=111 1011=123

Q' is determined by the leftmost remaining digits. Therefore,

Q'=(110)=6

Since (Q')(49)+R'=417>128, the iteration is performed again.

[ii] 417=(1 1010 0001) in binary form.

R'=(010 0001)=33

Q'=(11)=3

Since (Q")(49)+R=147+33=180>128, it is necessary to perform the iteration again.

[iii] 180=(1011 0100)

R'''=(011 0100)=52

Q'''=1

Since (Q')(49)+R'=49+52=101<128, But 101>79, the solution is:

R=101−79=22

FIG. 11C is a flowchart illustration of the processing steps for implementing the method and apparatus of the present invention to generate a modulo 79 solution for use in generating a pseudo-random 79 hop sequence. Since it is known that 79 lies between $2^6$ (=64$_{10}$) and $2^7$ (=128$_{10}$), it is not necessary to perform the iterative testing and incrementing of the value of P in steps 1104 and 1106 of FIG. 11A. Instead, the value of P is initialized at a known value equal to 7. Likewise, the value of the variable NR is a known value (128−79=49) for all modulo calculations and thus can be initialized at a value of 49 without the need for further calculation. The calculation in step 1110c is performed as discussed above in connection with step 1110c of FIG. 11A. In step 1112c, the calculation of the variable T can be simplified by representing the value of 49 as 32+16+1. This is the equivalent of $2^5+2^6+1$ Therefore, the calculation of the variable T can be performed by shifting the value of Q' left 5 times (the equivalent of multiplying by 32), adding the value of Q' shifted to the left 4 times (equivalent of multiplying by 16) and then adding the value of Q'+R'. The remaining steps illustrated in FIG. 11C are performed in the same manner as discussed above in connection with FIG. 11A. As will be understood by those of skill in the art, the method illustrated in FIG. 11C results in the determination of a modulo 79 solution with a minimum number of processing steps.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method of generating a communication frequency based on a modulo 23 solution for an input variable, comprising:

receiving an input variable;

generating an intermediate modulo 23 solution by:

generating a binary representation of said input variable;

using the five rightmost digits of said binary representation of said input variable to represent a first intermediate remainder (R');

using the remaining three leftmost digits to represent a first intermediate quotient (Q');

expressing said first intermediate modulo solution as a sum of said first intermediate quotient (Q') multiplied by 9 plus said first intermediate remainder (R'); and comparing said first intermediate modulo solution to the quantity 32;

indicating said first intermediate modulo solution as the modulo remainder (R) if said quantity of said first intermediate modulo solution is less than 23; and using said modulo remainder to generate said communication frequency.

2. The method according to claim 1 wherein an iterative process is performed if said first intermediate modulo solution is greater than 32, said iterative process comprising:

(a) generating a binary representation of said first intermediate modulo solution;

(b) using the five rightmost digits of said binary representation of said first intermediate modulo solution to represent a second intermediate remainder (R")

(c) using said remaining three leftmost digits to represent a second intermediate quotient (Q");

(d) expressing said second intermediate modulo solution as a sum of said second intermediate quotient (Q") multiplied by 9 plus said second intermediate remainder (R");

(e) comparing said second intermediate modulo solution to the quantity 32;

(f) indicating said second intermediate modulo solution as the modulo remainder (R) if said quantity of said second intermediate modulo solution is less than 23; and (g) repeating steps (a) through (f) if said intermediate modulo solution is greater than 32.

3. The method according to claim 2, wherein said multiplication of said second intermediate quotient (Q") by 9 is accomplished by:

shifting said binary representation of Q" to the left by three places; and adding said left-shifted value of Q" to the original value of Q".

4. The method according to claim 1, wherein said multiplication of said first intermediate quotient (Q') by 9 is accomplished by:

shifting said binary representation of Q' to the left by three places; and adding said left-shifted value of Q' to the original value of Q'.

5. A method of generating a modulo 79 solution for an input variable, comprising:

receiving an input variable;

generating an intermediate modulo 79 solution by:

generating a binary representation of said input variable;

using the seven rightmost digits of said binary representation of said input variable to represent a first intermediate remainder (R');

using the remaining leftmost digits to represent a first intermediate quotient (Q');

expressing said first intermediate modulo solution as a sum of said first intermediate quotient (Q') multiplied by 49 plus said first intermediate remainder (R'); and comparing said first intermediate modulo solution to the quantity 128;

indicating said first intermediate modulo solution as the modulo remainder (R) if said quantity of said first intermediate modulo solution is less than 79; and using said modulo remainder to generate said communication frequency.

6. The method according to claim 5 wherein an iterative process is performed if said first intermediate modulo solution is greater than 128, said iterative process comprising:

(a) generating a binary representation of said first intermediate modulo solution;

(b) using the seven rightmost digits of said binary representation of said first intermediate modulo solution to represent a second intermediate remainder (R")

(c) using said remaining leftmost digits to represent a second intermediate quotient (Q");

(d) expressing said second intermediate modulo solution as a sum of said second intermediate quotient (Q") multiplied by 49 plus said second intermediate remainder (R");

(e) comparing said second intermediate modulo solution to the quantity 128;

(f) indicating said second intermediate modulo solution as the modulo remainder (R) if said quantity of said second intermediate modulo solution is less than 79; and (g) repeating steps (a) through (f) if said intermediate modulo solution is greater than 128.

7. The method according to claim 6, wherein said multiplication of said second intermediate quotient (Q") by 49 is accomplished by:

shifting said binary representation of Q" to the left by 5 places to define a first shifted Q" value, shifting said binary representation of Q" to the left by 4 places to define a second shifted Q" value; and adding said first and second shifted values of Q" to the original value of Q".

8. The method according to claim 5, wherein said multiplication of said first intermediate quotient (Q') by 49 is accomplished by:

shifting said binary representation of Q' to the left by 5 places to define a first shifted Q' value, shifting said binary representation of Q' to the left by 4 places to define a second shifted Q' value; and adding said first and second shifted values of Q' to the original value of Q'.

9. A system for generating a communication signal at a predetermined frequency, comprising:

a transceiver, said transceiver comprising:

a radio frequency module;

a baseband core further comprising a frequency control functionality;

a frequency hopper within said baseband core of said transceiver, said frequency hopper being operable to generate a plurality of frequencies related to a modulo 23 solution of an input variable, wherein said frequency hopper generates an intermediate modulo 23 solution by:

generating a binary representation of said input variable;

using the five rightmost digits of said binary representation of said input variable to represent a first intermediate remainder (R');

using the remaining three leftmost digits to represent a first intermediate quotient (Q');

expressing said first intermediate modulo solution as a sum of said first intermediate quotient (Q') multiplied by 9 plus said first intermediate remainder (R');

comparing said first intermediate modulo solution to the quantity 32; and indicating said first intermediate modulo solution as the modulo remainder (R) if said quantity of said first intermediate modulo solution is less than 23.

10. The system according to claim 9 wherein an iterative process is performed if said first intermediate modulo solution is greater than 32, said iterative process comprising:

(a) generating a binary representation of said first intermediate modulo solution;

(b) using the five rightmost digits of said binary representation of said first intermediate modulo solution to represent a second intermediate remainder (R")

(c) using said remaining three leftmost digits to represent a second intermediate quotient (Q");

(d) expressing said second intermediate modulo solution as a sum of said second intermediate quotient (Q") multiplied by 9 plus said second intermediate remainder (R");

(e) comparing said second intermediate modulo solution to the quantity 32;

(f) indicating said second intermediate modulo solution as the modulo remainder (R) if said quantity of said second intermediate modulo solution is less than 23; and (g) repeating steps (a) through (f) if said intermediate modulo solution is greater than 32.

11. The system according to claim 10, wherein said multiplication of said second intermediate quotient (Q") by 9 is accomplished by:

shifting said binary representation of Q" to the left by three places; and adding said left-shifted value of Q" to the original value of Q".

12. The system according to claim 9, wherein said multiplication of said first intermediate quotient (Q') by 9 is accomplished by:

shifting said binary representation of Q' to the left by three places; and adding said left-shifted value of Q' to the original value of Q'.

13. A system for generating a communication signal at a predetermined frequency, comprising:

a transceiver, said transceiver comprising:

a radio frequency module;

a baseband core further comprising a frequency control functionality;

a frequency hopper within said baseband core of said transceiver, said frequency hopper being operable to generate a plurality of frequencies related to a modulo 79 solution of an input variable, wherein said frequency hopper generates an intermediate modulo 79 solution by:

generating a binary representation of said input variable;

using the seven rightmost digits of said binary representation of said input variable to represent a first intermediate remainder (R');

using the remaining leftmost digits to represent a first intermediate quotient (Q');
expressing said first intermediate modulo solution as a sum of said first intermediate quotient (Q') multiplied by 49 plus said first intermediate remainder (R');
comparing said first intermediate modulo solution to the quantity 128; and
indicating said first intermediate modulo solution as the modulo remainder (R) if said quantity of said first intermediate modulo solution is less than 79.

14. The system according to claim 13 wherein an iterative process is performed if said first intermediate modulo solution is greater than 128, said iterative process comprising:
   (a) generating a binary representation of said first intermediate modulo solution;
   (b) using the seven rightmost digits of said binary representation of said first intermediate modulo solution to represent a second intermediate remainder (R")
   (c) using said remaining leftmost digits to represent a second intermediate quotient (Q");
   (d) expressing said second intermediate modulo solution as a sum of said second intermediate quotient (Q") multiplied by 49 plus said second intermediate remainder (R");
   (e) comparing said second intermediate modulo solution to the quantity 128;
   (f) indicating said second intermediate modulo solution as the modulo remainder (R) if said quantity of said second intermediate modulo solution is less than 79; and
   (g) repeating steps (a) through (f) if said intermediate modulo solution is greater than 128.

15. The system according to claim 14, wherein said multiplication of said second intermediate quotient (Q") by 9 is accomplished by:
   shifting said binary representation of Q' to the left by 5 places to define a first shifted Q' value,
   shifting said binary representation of Q' to the left by 4 places to define a second shifted Q' value; and
   adding said first and second shifted values of Q' to the original value of Q'.

16. The system according to claim 13, wherein said multiplication of said first intermediate quotient (Q') by 49 is accomplished by:
   shifting said binary representation of Q' to the left by 5 places to define a first shifted Q' value,
   shifting said binary representation of Q' to the left by 4 places to define a second shifted Q' value; and
   adding said first and second shifted values of Q' to the original value of Q'.

17. A system for generating communication frequencies in a wireless interface system that services communications between a wirelessly enabled host and at least one user input device, comprising:
   a wireless interface unit that wirelessly interfaces with the wirelessly enabled host, wherein the wireless interface unit comprises:
      an analog module including a transceiver unit and a frequency synthesizer,
      a baseband module including a frequency hopper, wherein said frequency hopper is operable to generate a plurality of frequencies related to a modulo 23 solution of an input variable, wherein said frequency hopper generates an intermediate modulo 23 solution by:
         generating a binary representation of said input variable;
         using the five rightmost digits of said binary representation of said input variable to represent a first intermediate remainder (R');
         using the remaining three leftmost digits to represent a first intermediate quotient (Q');
         expressing said first intermediate modulo solution as a sum of said first intermediate quotient (Q') multiplied by 9 plus said first intermediate remainder (R');
         comparing said first intermediate modulo solution to the quantity 32; and
         indicating said first intermediate modulo solution as the modulo remainder (R) if said quantity of said first intermediate modulo solution is less than 23; and
      wherein said frequency synthesizer is operable to generate a frequency hop sequence using said result of said modulo 23 solution generated by said frequency hopper.

18. The system according to claim 17 wherein an iterative process is performed if said first intermediate modulo solution is greater than 32, said iterative process comprising:
   (a) generating a binary representation of said first intermediate modulo solution;
   (b) using the five rightmost digits of said binary representation of said first intermediate modulo solution to represent a second intermediate remainder (R")
   (c) using said remaining three leftmost digits to represent a second intermediate quotient (Q");
   (d) expressing said second intermediate modulo solution as a sum of said second intermediate quotient (Q") multiplied by 9 plus said second intermediate remainder (R");
   (e) comparing said second intermediate modulo solution to the quantity 32;
   (f) indicating said second intermediate modulo solution as the modulo remainder (R) if said quantity of said second intermediate modulo solution is less than 23; and
   (g) repeating steps (a) through (f) if said intermediate modulo solution is greater than 32.

19. The system according to claim 18, wherein said multiplication of said second intermediate quotient (Q") by 9 is accomplished by:
   shifting said binary representation of Q" to the left by three places; and
   adding said left-shifted value of Q" to the original value of Q".

20. The system according to claim 17, wherein said multiplication of said first intermediate quotient (Q') by 9 is accomplished by:
   shifting said binary representation of Q' to the left by three places; and
   adding said left-shifted value of Q' to the original value of Q'.

21. A system for generating communication frequencies in a wireless interface system that services communications between a wirelessly enabled host and at least one user input device, comprising:
   a wireless interface unit that wirelessly interfaces with the wirelessly enabled host, wherein the wireless interface unit comprises:
      an analog module including a transceiver unit and a frequency synthesizer, a baseband module including a frequency hopper, wherein said frequency hopper is operable to generate a plurality of frequencies related to a modulo 79 solution of an input variable, wherein said frequency hopper generates an intermediate modulo 79 solution by:

generating a binary representation of said input variable;

using the seven rightmost digits of said binary representation of said input variable to represent a first intermediate remainder (R');

using the remaining leftmost digits to represent a first intermediate quotient (Q');

expressing said first intermediate modulo solution as a sum of said first intermediate quotient (Q') multiplied by 49 plus said first intermediate remainder (R');

comparing said first intermediate modulo solution to the quantity 128; and indicating said first intermediate modulo solution as the modulo remainder (R) if said quantity of said first intermediate modulo solution is less than 79.

22. The system according to claim 21 wherein an iterative process is performed if said first intermediate modulo solution is greater than 128, said iterative process comprising:

(a) generating a binary representation of said first intermediate modulo solution;

(b) using the seven rightmost digits of said binary representation of said first intermediate modulo solution to represent a second intermediate remainder (R")

(c) using said remaining leftmost digits to represent a second intermediate quotient (Q");

(d) expressing said second intermediate modulo solution as a sum of said second intermediate quotient (Q") multiplied by 49 plus said second intermediate remainder (R");

(e) comparing said second intermediate modulo solution to the quantity 128;

(f) indicating said second intermediate modulo solution as the modulo remainder (R) if said quantity of said second intermediate modulo solution is less than 79; and (g) repeating steps (a) through (f) if said intermediate modulo solution is greater than 128.

23. The system according to claim 22, wherein said multiplication of said first intermediate quotient (Q') by 49 is accomplished by:

shifting said binary representation of Q' to the left by 5 places to define a first shifted Q' value, shifting said binary representation of Q' to the left by 4 places to define a second shifted Q' value; and adding said first and second shifted values of Q' to the original value of Q'.

24. The system according to claim 23, wherein said multiplication of said second intermediate quotient (Q") by 9 is accomplished by:

shifting said binary representation of Q' to the left by 5 places to define a first shifted Q' value, shifting said binary representation of Q' to the left by 4 places to define a second shifted Q' value; and adding said first and second shifted values of Q' to the original value of Q'.

* * * * *